US009046971B2

United States Patent
Chuang et al.

(10) Patent No.: US 9,046,971 B2
(45) Date of Patent: Jun. 2, 2015

(54) DETECTION METHOD AND DETECTION DEVICE FOR DETECTING MULTIPLE CONTACTS ON TOUCH PANEL ACCORDING PRELIMINARY SENSING DATA

(75) Inventors: Hsu-Ming Chuang, Taichung (TW); Shih-Tzung Chou, Hsinchu County (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 260 days.

(21) Appl. No.: 13/281,444

(22) Filed: Oct. 26, 2011

(65) Prior Publication Data

US 2012/0098775 A1 Apr. 26, 2012

(30) Foreign Application Priority Data

Oct. 26, 2010 (TW) .............................. 99136510 A

(51) Int. Cl.
G06F 3/044 (2006.01)
G06F 3/041 (2006.01)

(52) U.S. Cl.
CPC .............. *G06F 3/044* (2013.01); *G06F 3/0416* (2013.01); *G06F 2203/04104* (2013.01)

(58) Field of Classification Search
CPC .......... G06F 3/03; G06F 3/044; G06F 3/045; G06F 3/041; G06F 3/0416; G06F 2203/04104; G06F 3/0412
USPC ...................... 345/173–174; 178/18.03, 18.06
See application file for complete search history.

(56) References Cited

U.S. PATENT DOCUMENTS

| 6,075,520 | A | * | 6/2000 | Inoue et al. .................... 345/173 |
| 2006/0244454 | A1 | * | 11/2006 | Gard et al. ..................... 324/326 |
| 2009/0273579 | A1 | * | 11/2009 | Zachut et al. ................. 345/174 |
| 2009/0284495 | A1 | * | 11/2009 | Geaghan et al. .............. 345/174 |
| 2010/0007631 | A1 | * | 1/2010 | Chang ........................... 345/174 |
| 2012/0075205 | A1 | * | 3/2012 | Huang et al. ................. 345/173 |

\* cited by examiner

*Primary Examiner* — Hong Zhou

(57) ABSTRACT

A detection method for detecting a plurality of contacts on a touch panel which includes a plurality of first sensing axes on a first dimension and a plurality of second sensing axes on a second dimension includes: generating a preliminary sensing data according to the contacts on the touch panel; determining at least one specific sensing axis included in the plurality of first sensing axes according to the preliminary sensing data; utilizing a configuration circuit to configure a driving and receiving sequence of the plurality of first sensing axes and the plurality of second sensing axes for obtaining a sensing output; and utilizing a determining circuit to receive a completion instruction.

12 Claims, 3 Drawing Sheets

DETECTION METHOD AND DETECTION DEVICE FOR DETECTING MULTIPLE CONTACTS ON TOUCH PANEL ACCORDING PRELIMINARY SENSING DATA

BACKGROUND OF THE INVENTION

1. Field of the Invention

The disclosed embodiments of the present invention relate to a contact detection scheme, and more particularly, to a detection method and detection device for detecting a plurality of contacts on a touch panel.

2. Description of the Prior Art

In a regular mutual capacitance touch panel, there are two common detection methods. The first detection method is orderly driving all sensing axis on a first dimension (e.g., X axis) on a touch panel and then orderly receiving a sensing signal corresponding each sensing axis on X axis through each sensing axis on a second dimension (e.g., Y axis), and then orderly driving each sensing axis on Y axis and orderly receive a sensing signal corresponding to each sensing axis on Y axis through each sensing axis on X axis. For example, please refer to FIG. 1, which is a schematic diagram of a conventional detection circuit 200 utilized to detect multiple contacts on a touch panel 100. As can be known from the figure, the conventional touch panel 100 has 8 sensing axes X1~X8 and Y1~Y8 on X axis and Y axis, respectively, wherein each sensing axis utilizes a multiplexer 210 to determine how the sensing axis is connected to an analog-to-digital converter (ADC) 220 and its working mode through a register device 211. Please note that only one register device is shown in the figure for illustrative purposes. When a driving circuit 250 is used to drive the sensing axis X1, the register device 211 is concurrently configured for utilizing the multiplexer 210 to receive a sensing signal corresponding to the sensing axis X1 on the sensing axis Y1, and then utilizing the ADC 220 to convert the sensing signal into a digital signal and store the digital signal in a storage element (e.g., memory) 230, such that it can be read by a processor (e.g. a micro control unit, MCU) through a control interface 240 later. Next, the conventional method keeps driving the sensing axis X1, and modifies the configuration of the sensing axis Y1 and Y2 in the register device 211 so as to stop the sensing axis Y1 from receiving any receiving signal. After that, the conventional method starts to receive a sensing signal corresponding to the sensing axis X1 on the sensing axis Y2, utilizes the ADC 220 to convert the sensing signal into a digital signal, and then utilizing the processor to read the digital signal via the control interface 240. By the same token, the following sensing signals would be received, stored, and read until all the sensing signals corresponding to the sensing axis X1 on the sensing axis Y1~Y8 are read by the processor.

In FIG. 1, the conventional detection circuit 200 needs massive configurations and frequent data access for completely detecting a touch event on the touch panel 100. For example, if the detection circuit 200 scan all areas on the touch panel 100 to obtain coordinates of every contact included therein, it would be required to configure the register device 211 and access data through the control interface 240 for at least 8*8*2=128 times. Please refer to FIG. 2, which is a schematic diagram of a preliminary detection of multiple contact events on the touch panel 100, wherein the sensing signal corresponding to Y axis that is received on X axis is denoted as SX, and the sensing signal corresponding to X axis that is received on Y axis is denoted as SY. As can be known from the figure, the sensing signal SX indicates that there are contacts on the sensing axes X2, X3, X6 and X7, and the sensing signal SX indicates that there are contacts on the sensing axes Y2, Y3, Y4, Y5 and Y6. Thus, even a preliminary detection procedure is adapted to narrow down the scan range, the number of configurations and data accesses of the embodiment in FIG. 2 is still equal to at least 4*5*2=40.

Therefore, how to enhance touch event detection efficiency of a touch panel and reduce the number of configurations and data accesses required by the touch event detection is still an issue to be solved in this pertinent field.

SUMMARY OF THE INVENTION

In accordance with exemplary embodiments of the present invention, a detection method and detection device for detecting a plurality of contacts utilizing a preliminary detection data are proposed to solve the above-mentioned problem.

According to a first aspect of the present invention, an exemplary detection method for detecting a plurality of contacts on a touch panel is disclosed. The touch panel includes a plurality of first sensing axes on a first dimension and a plurality of second sensing axes on a second dimension. The exemplary detection method includes a plurality of first sensing axes on a first dimension and a plurality of second sensing axes on a second dimension includes: generating a preliminary sensing data according to the contacts on the touch panel; determining at least one specific sensing axis included in the plurality of first sensing axes according to the preliminary sensing data; utilizing a configuration circuit to configure a driving and receiving sequence of the plurality of first sensing axes and the plurality of second sensing axes for obtaining a sensing output; and utilizing a determining circuit to receive a completion instruction, wherein when the determining circuit receives the completion instruction, the determining circuit determines a touch detection result according to the sensing output, wherein the step of utilizing a configuration circuit comprises: utilizing a driving circuit to drive the at least one specific sensing axis one-by-one; respectively receive a sensing data corresponding to the at least one specific sensing axis from the plurality of second sensing axes of the touch panel through a multiplexer, and accordingly obtaining a sensing output; and storing the sensing output in a storage element.

According to a second aspect of the present invention, an exemplary detection device for detecting a plurality of contacts on a touch panel is disclosed. The touch panel includes a plurality of first sensing axes on a first dimension and a plurality of second sensing axes on a second dimension. The exemplary detection device includes a driving circuit, a multiplexer, a preliminary detection circuit, a sensing axis selection circuit, a storage element, a configuration circuit and a determining circuit. The driving circuit is for driving the plurality of first sensing axes and the plurality of second sensing axes. The multiplexer is for receiving at least a sensing data corresponding to the plurality of first sensing axes and the plurality of second sensing axes. The preliminary detection circuit is coupled to the driving circuit and the multiplexer, for utilizing the driving circuit and the multiplexer to generate a preliminary sensing data according to the contacts on the touch panel. The sensing axis selection circuit is coupled to preliminary detection circuit, for determining at least one specific sensing axis in the plurality of first sensing axes according to the preliminary sensing data. The configuration circuit is coupled to the driving circuit, the multiplexer, the sensing axis selection circuit and the storage element, for configuring a driving and receiving sequence of the plurality of first sensing axes and the plurality of second sensing axes for obtaining a sensing output, obtaining a sensing output by respectively receiving a sensing data corresponding to the at least one specific sensing axis from the plurality of second specific sensing axes of the touch panel through the multiplexer after controlling the driving circuit to drive the at least one specific sensing axis one-by-one, and storing the sensing output in the storage element. The determining circuit is coupled to the storage element, for receiving a completion instruction, wherein when the determining circuit receives the completion instruction, the determining circuit determines a touch detection result according to the sensing output in the storage element.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
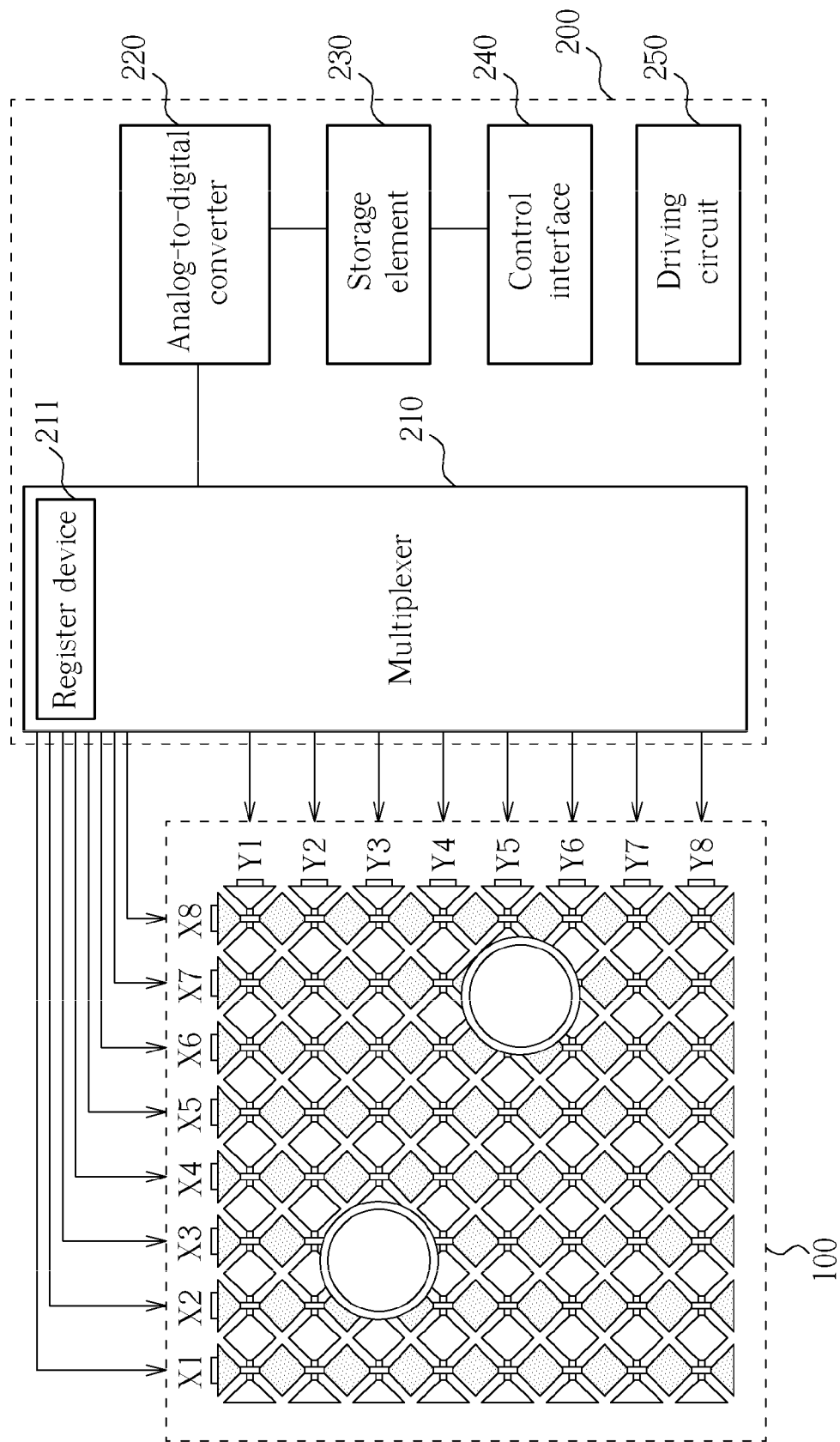
FIG. 1 is a schematic diagram of a conventional detection circuit utilized to detect multiple contacts on a touch panel.
Figure 2:
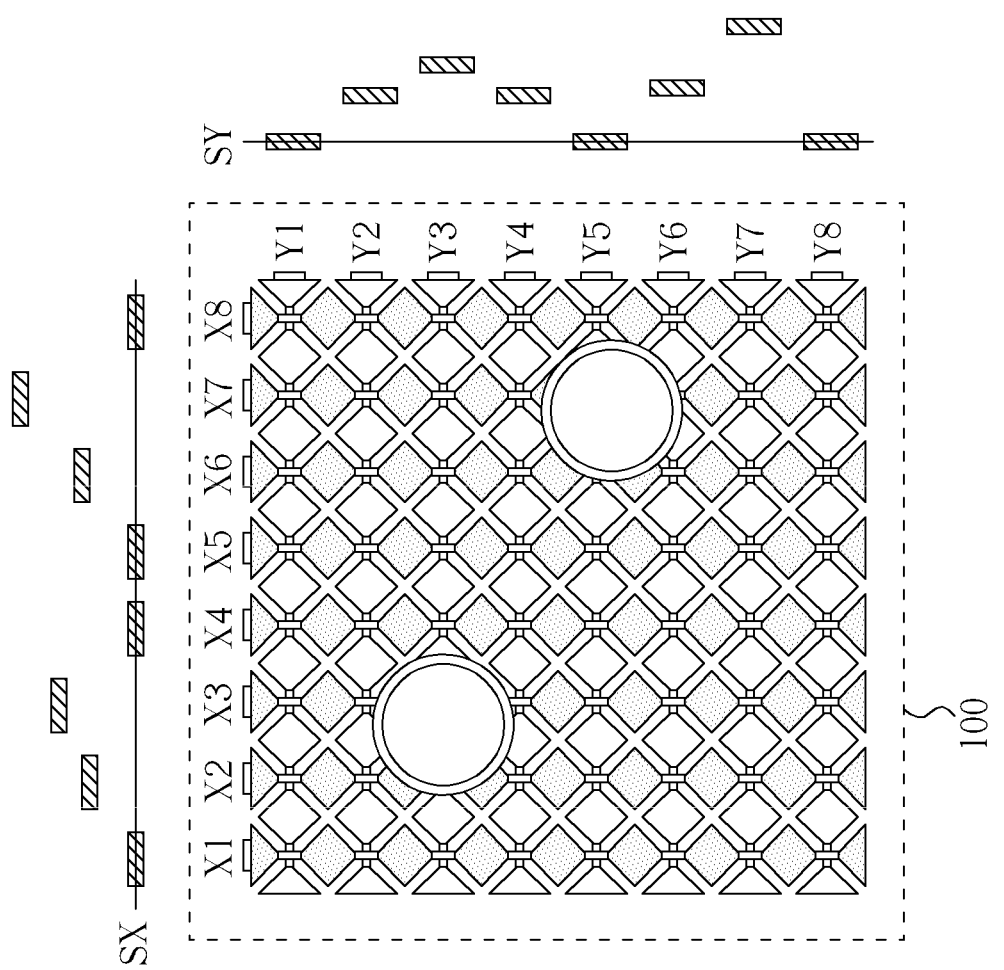
FIG. 2 is a schematic diagram of a preliminary detection of multiple contact events detected on a touch panel.
Figure 3:
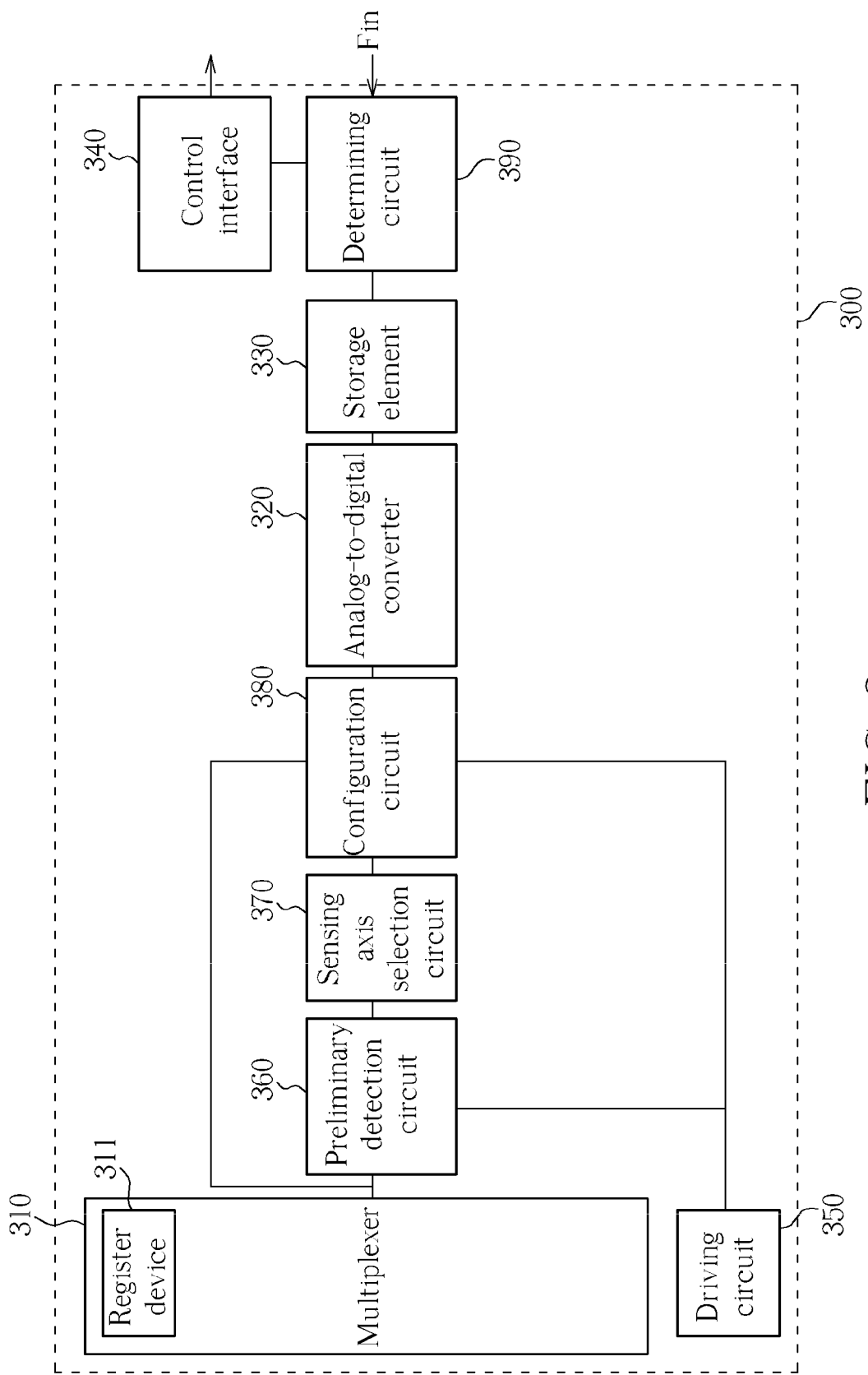
FIG. 3 is a schematic diagram of a detection device applied to a touch panel according to an embodiment of the present invention.

Please refer to FIG. 3, which is a schematic diagram of a detection device 300 applied to a touch panel according to an embodiment of the present invention. The touch panel includes a plurality of vertical sensing axes on a first dimension (e.g., X axis), and includes a plurality of horizontal sensing axes on a second dimension, (e.g., Y axis). For example, the detection device 300 is applied to the touch panel 100 shown in FIG. 2 to detect contacts thereon, wherein the touch panel 100 has vertical sensing axes X1~X8 and horizontal sensing axes Y1~Y8. In this embodiment, the detection device 300 includes (but not limited to) a multiplexer 310, a analog-to-digital converter (ADC) 320, a storage element (e.g., memory) 330, a control interface 340, a driving circuit 350, a preliminary detection circuit 360, a sensing axis selection circuit 370, a configuration circuit 380 and a determining circuit 390. As the multiplexer 310 with a register device 311 included therein, the ADC 320, the storage element 330, the control interface 340 and the driving circuit 350 have structure and function substantially identical to that of the corresponding elements included in the conventional detection circuit 200, detailed operations are omitted hereinafter for brevity.

First, in a first embodiment of the present invention, the preliminary detection circuit 360 would utilize the driving circuit 350 and the multiplexer 310 to generate a preliminary sensing data SP according to all contacts on the touch panel. For example, the driving circuit 350 is first used to concurrently drive the vertical sensing axes X1~X8 of the touch panel 100, and the multiplexer 310 is controlled to receive corresponding sensing signal SY on the horizontal sensing axes Y1~Y8 of the touch panel 100; next, the driving circuit 350 is used to concurrently drive the horizontal sensing axes Y1~Y8, and the multiplexer 310 is controlled to receive corresponding sensing signal SX on the vertical sensing axes X1~X8; and finally, the preliminary sensing data SP is generated according to the sensing signal SY and the sensing signal SX. As can be known from the exemplary embodiment in FIG. 2, the sensing signal SX indicates that only four vertical sensing axes X2, X3, X6 and X7 among the vertical sensing axes have response signals, and the sensing signal SY indicates that only horizontal sensing axes Y2, Y3, Y4, Y5 and Y6 among the horizontal sensing axes have response signals. The sensing axis selection circuit 370 then determines at least one specific sensing axis according to the amount of the vertical sensing axes having response signals and the amount of the horizontal sensing axes having response signals in the preliminary sensing data SP. In order to simplify the following procedures, the sensing axis selection circuit 370 will select sensing axes with smaller amount of sensing axes having response signals on a dimension as the specific sensing axes. In the embodiment, the sensing axis selection circuit 370 selects vertical sensing axes X2, X3, X6 and X7 as the specific sensing axes. Please note that, this is for illustrative purposes only, and not meant to be limitations of the present invention. If the amount of the horizontal sensing axes having response signals is less than the amount of the vertical sensing axes having response signals in another embodiment, the sensing axis selection circuit 370 will select these horizontal sensing axes having response signals as the specific sensing axes.

In another embodiment, the preliminary sensing data SP includes a first preliminary sensing data and a second preliminary sensing data, wherein the preliminary detection circuit 360 concurrently controls the driving circuit 350 to drive a plurality of vertical sensing axes, and controls the multiplexer 310 to respectively receive a first sensing data corresponding to each of the vertical sensing axes on a plurality of horizontal sensing axes to thereby generate the first preliminary sensing data, and concurrently controls the driving circuit 350 to drive these horizontal sensing axes, and controls the multiplexer 310 to respectively receive a second sensing data corresponding to each of the horizontal sensing axes on these vertical sensing axes to thereby generate the second preliminary sensing data. In addition, the preliminary detection circuit 360 further performs a selection operation of sensing data to lower the possibility of misjudgment. For example, the preliminary detection circuit 360 generates the first preliminary sensing data according to each first sensing data exceeding a threshold value TH, and/or generates the second preliminary sensing data according to each second sensing data exceeding the threshold value TH.

After the at least one specific sensing axis is determined, the configuration circuit 380 will set a driving and receiving sequence of the at least one specific sensing axis among the first sensing axes and the second sensing axis having dimension different from that of the at least one specific sensing axis for generating a sensing output. When the at least one specific sensing axis belongs to the vertical sensing axes, these second sensing axes belong to the horizontal sensing axes; on the other hand, when the at least one specific sensing axis belongs to the horizontal sensing axes, these second sensing axes belong to the vertical sensing axes.

First, the configuration circuit 380 determines the driving and receiving sequence according to the at least one specific sensing axis and these second sensing axes. For example, the configuration circuit 380 sets the driving circuit 350 to drive a specific sensing axis (vertical sensing axis) X2, and sets the multiplexer 310 to use all the second sensing axes (horizontal sensing axes) Y1~Y8 to respectively receive sensing data corresponding to the specific sensing axis X2 (i.e., set corresponding second sensing axes (horizontal sensing axes) Y1~Y8 in the register device 311 to a read state), and store the sensing data in the storage element 330 through the ADC 320. Next, the driving circuit 350 is utilized to drive a specific sensing axis (i.e., specific sensing axis X3), and concurrently set the multiplexer 310 to use all the second sensing axes Y1~Y8 to respectively receive sensing data corresponding to the specific sensing axis X3 and then store the sensing data in the storage element 330. By the same token, the configuration circuit 380 would utilize the driving circuit 350 to drive the specific sensing axes X2, X3, X6 and X7 one-by-one, and concurrently set the multiplexer 310 to respectively receive sensing data corresponding to the specific sensing axis on the second sensing axes (horizontal sensing axes) Y1~Y8 to generate a sensing output (i.e., a set of sensing data corresponding to the first specific sensing axes X2, X3, X6 and X7 respectively received on the second sensing axis (horizontal sensing axes) Y1~Y8) and then store the sensing output in the storage element 330. Finally, when the determining circuit 390 receives a finish command Fin, the determining circuit 390 determines a contact detection result according to the sensing output in the storage element 330, and outputs the contact detection result via the control interface 340 for determining these contacts corresponding to the touch event.

Please note that, in this embodiment, the detection device 300 uses the ADC 320 to digitally store the sensing data in the storage element 330; however, this is not meant to be limitations of the scope of the present invention. For example, the ADC 320 may be built in the multiplexer 310. Therefore, when the multiplexer 310 receives a sensing data corresponding to a sensing axis, the multiplexer 310 immediately outputs digitalized sensing data for the following processing.

In the aforementioned embodiment, besides the preliminary detection procedure, the configuration circuit 380 only needs to configure the multiplexer 310 and the driving circuit 350 once, and can be interrupted in response to finish of the scanning operation or the finish command Fin manually sent by the user, such that a processor can read the contact detection result in a batch processing manner. In comparison with the conventional detection circuit 200, the number of configurations required by the detection device 300 according to the present invention is greatly reduced, thereby significantly lowering the scan time needed. Besides, the overall performance of the processor may be improved due to the fact that the processor is allowed to perform other operations during the scanning procedure.

In the aforementioned embodiment, the preliminary detection circuit 360 respectively drives all the vertical sensing axes and then receives response signals on all the horizontal sensing axes, and respectively drives all the horizontal sensing axes and then receives response signals on all the vertical sensing axes. Next, the preliminary detection circuit 360 detects the number of the vertical sensing axes having response signals and the number of the horizontal sensing axes having response signals, and selects sensing axes with the smaller number of sensing axes having response signals on a dimension as the specific sensing axes from these vertical and horizontal sensing axes having response signals. In this embodiment, 4 vertical sensing axes have response signals, and 5 horizontal sensing axes have response signals. However, in a second embodiment of the present invention, the preliminary detection circuit 360 may drive these sensing axes on a dimension selected from these vertical sensing axes X1~X8 and these horizontal sensing axes Y1~Y8, and receive response signals on these sensing axes on another dimension to thereby generate the preliminary sensing data SP. The sensing axis selection circuit 370 selects the at least one specific sensing axis according to the preliminary sensing data SP. For example, in the embodiment in FIG. 2, when the preliminary detection circuit 360 decides to drive the selected horizontal sensing axes Y1~Y8 and respectively receives a sensing data corresponding to each of the horizontal sensing axes on the vertical sensing axes X1~X8 to generate the preliminary sensing data SP, and the sensing axis selection circuit 370 can derive sensing axes having response signals from the preliminary sensing data SP (i.e., the vertical sensing axes X2, X3, X6 and X7), the vertical sensing axes X2, X3, X6 and X7 are therefore selected as the specific sensing axes. On the other hand, when the preliminary detection circuit 360 decides to drive the selected vertical sensing axes X1~X8 and respectively receives a sensing data corresponding to each of the vertical sensing axes on the horizontal sensing axes Y1~Y8 to generate the preliminary sensing data SP, and the sensing axis selection circuit 370 can derive sensing axes having response signals from the preliminary sensing data SP (i.e., horizontal sensing axes Y2, Y3, Y4, Y6 and Y7), the horizontal sensing axes Y2, Y3, Y4, Y6 and Y7 are therefore selected as the specific sensing axes. After these specific sensing axes are determined, the detection device 300 will follow operational procedures of the aforementioned first embodiment to obtain the contact detection result. The related descriptions are omitted here for brevity.

To sum up, the present invention provides a detection method and related detection device which can rapidly read contact detection data and transmit it to a processor by configuring driving/sensing sequence of each sensing axis on a touch panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detection method for detecting a plurality of contacts on a touch panel, the touch panel comprising a plurality of first sensing axes on a first dimension and a plurality of second sensing axes on a second dimension, the detection method comprising:

generating a preliminary sensing data according to contacts on the touch panel;

determining at least one specific sensing axis included in the plurality of first sensing axes according to the preliminary sensing data;

utilizing a configuration circuit to refer to the at least one specific sensing axis to configure a driving and receiving sequence of the plurality of first sensing axes and the plurality of second sensing axes only once for obtaining a sensing output, wherein an input and an output of the configuration circuit are an analog input and an analog output respectively, and the step of utilizing the configuration circuit to configure the driving and receiving sequence of the plurality of first sensing axes and the plurality of second sensing axes only once for obtaining the sensing output comprises:

utilizing the configuration circuit to set a driving circuit to drive the at least one specific sensing axis one-by-one;

utilizing the configuration circuit to set a multiplexer to respectively receive a sensing data corresponding to the at least one specific sensing axis from the plurality of second sensing axes of the touch panel;

utilizing an analog-to-digital converter to convert the received sensing data into digitalized sensing data as a sensing output; and storing the sensing output in a storage element, wherein the analog-to-digital converter is coupled between the configuration circuit and the storage element; and utilizing a determining circuit to receive a completion instruction, wherein when the determining circuit receives the completion instruction, the determining circuit determines a touch detection result according to the sensing output stored in the storage element.

2. The detection method of claim 1, wherein the preliminary sensing data comprises a first preliminary sensing data and a second preliminary sensing data, and the step of generating the preliminary sensing data comprises:
concurrently driving the plurality of second sensing axes, and generating the first preliminary sensing data by respectively receiving a first sensing data corresponding to each of the plurality second sensing axes from the plurality of first sensing axes; and
concurrently driving the plurality of first sensing axes, and generating the second preliminary sensing data by respectively receiving a second sensing data corresponding to each of the plurality first sensing axes from the plurality of second sensing axes;
wherein a data amount of the first preliminary sensing data is not greater than a data amount of the second preliminary sensing data.

3. The detection method of claim 2, wherein the step of generating the first preliminary sensing data comprises:
generating the first preliminary sensing data according to first sensing data each exceeding a threshold value.

4. The detection method of claim 2, wherein the step of generating the second preliminary sensing data comprises:
generating the second preliminary sensing data according to second sensing data each exceeding a threshold value.

5. The detection method of claim 1, wherein the step of generating the preliminary sensing data comprises:
concurrently driving the plurality of second sensing axes, and generating the preliminary sensing data by respectively receiving a first sensing data corresponding to each of the plurality of second sensing axes from the plurality of first sensing axes; and
the step of determining the at least one specific sensing axis in the plurality of first sensing axes according to the preliminary sensing data comprises:
selecting the at least one specific sensing axis from the plurality of first sensing axes according to the preliminary sensing data.

6. The detection method of claim 1, wherein the completion command is a user input command.

7. A detection device for detecting a plurality of contacts on a touch panel, the touch panel comprising a plurality of first sensing axes on a first dimension and a plurality of second sensing axes on a second dimension, the detection device comprising:
a driving circuit, for driving the plurality of first sensing axes and the plurality of second sensing axes;
a multiplexer, for receiving at least a sensing data corresponding to the plurality of first sensing axes and the plurality of second sensing axes;
a preliminary detection circuit, coupled to the driving circuit and the multiplexer, for utilizing the driving circuit and the multiplexer to generate a preliminary sensing data according to contacts on the touch panel;
a sensing axis selection circuit, coupled to preliminary detection circuit, for determining at least one specific sensing axis in the plurality of first sensing axes according to the preliminary sensing data;
a storage element;
a configuration circuit, coupled to the driving circuit, the multiplexer, the sensing axis selection circuit and the storage element, wherein an input and an output of the configuration circuit are an analog input and an analog output respectively, and the configuration circuit is arranged for referring to the at least one specific sensing axis to configure a driving and receiving sequence of the plurality of first sensing axes and the plurality of second sensing axes only once for obtaining a sensing output, and obtaining a sensing output by setting the multiplexer to respectively receive a sensing data corresponding to the at least one specific sensing axis from the plurality of second specific sensing axes of the touch panel after controlling the driving circuit to drive the at least one specific sensing axis one-by-one;
an analog-to-digital converter, coupled between the configuration circuit and the storage element, wherein the configuration circuit stores the sensing output in the storage element through the analog-to-digital converter, and the analog-to-digital converter converts the sensing data received by the configuration circuit into digitalized sensing data as the sensing output to be stored in the storage element; and
a determining circuit, coupled to the storage element, for receiving a completion instruction, wherein when the determining circuit receives the completion instruction, the determining circuit determines a touch detection result according to the sensing output in the storage element.

8. The detection device of claim 7, wherein:
the preliminary sensing data comprises a first preliminary sensing data and a second preliminary sensing data;
the driving circuit concurrently drives the plurality of second sensing axes, and the configuration circuit controls the multiplexer to respectively receive a first sensing data corresponding to each of the plurality of second sensing axes from the plurality of first sensing axes, to generate the first preliminary sensing data; and
the driving circuit concurrently drives the plurality of first sensing axes, and the configuration circuit controls the multiplexer to respectively receive a second sensing data corresponding to each of the plurality of first sensing axes from the plurality of second sensing axes, to generate the second preliminary sensing data;
wherein a data amount of the first preliminary sensing data is not greater than a data amount of the second preliminary sensing data.

9. The detection device of claim 8, wherein the preliminary detection circuit generates the first preliminary sensing data according to first sensing data each exceeding a threshold value.

10. The detection device of claim 8, wherein the preliminary detection circuit further generates the second preliminary sensing data according to second sensing data each exceeding a threshold value.

11. The detection device of claim 7, wherein the preliminary detection circuit concurrently drives the plurality of second sensing axes, and generates the preliminary sensing data by respectively receiving a sensing data corresponding to each of the plurality of second sensing axes from the plurality of first sensing axes; and the sensing axis selection circuit selects the at least one specific sensing axis from the plurality of first sensing axes according to the preliminary sensing data.

12. The detection device of claim 7, wherein the completion command is a user input command.

* * * * *